United States Patent
Sasaki et al.

(10) Patent No.: US 10,944,127 B2
(45) Date of Patent: Mar. 9, 2021

(54) NON-AQUEOUS ELECTROLYTE SECONDARY BATTERY

(71) Applicant: TDK CORPORATION, Tokyo (JP)

(72) Inventors: Takashi Sasaki, Tokyo (JP); Hideaki Seki, Tokyo (JP); Hirofumi Kakuta, Tokyo (JP); Akinobu Nojima, Tokyo (JP); Shin Fujita, Tokyo (JP)

(73) Assignee: TDK CORPORATION, Tokyo (JP)

( * ) Notice: Subject to any disclaimer, the term of this patent is extended or adjusted under 35 U.S.C. 154(b) by 29 days.

(21) Appl. No.: 15/926,249

(22) Filed: Mar. 20, 2018

(65) Prior Publication Data
US 2018/0287200 A1 Oct. 4, 2018

(30) Foreign Application Priority Data
Mar. 31, 2017 (JP) .............................. JP2017-069544

(51) Int. Cl.
*H01M 10/6553* (2014.01)
*H01M 10/6551* (2014.01)
(Continued)

(52) U.S. Cl.
CPC ......... *H01M 10/0525* (2013.01); *H01M 2/16* (2013.01); *H01M 4/583* (2013.01);
(Continued)

(58) Field of Classification Search
CPC .......... H01M 10/617; H01M 10/6553; H01M 10/6554; H01M 10/0525; H01M 10/0459;
(Continued)

(56) References Cited

U.S. PATENT DOCUMENTS

2009/0169990 A1\* 7/2009 Gardner .................. H01M 2/30
429/179
2015/0318584 A1\* 11/2015 Yebka ................... G06F 1/1635
361/679.02

FOREIGN PATENT DOCUMENTS

JP 2006-040772 A 2/2006
JP 2016-181326 A 10/2016

OTHER PUBLICATIONS

Samba, A., Omar, N., Gualous, H., Capron, O., Bossche, P. V., & Mierlo, J. V. (2014). Impact of Tab Location on Large Format Lithium-Ion Pouch Cell Based on Fully Coupled Tree-Dimensional Electrochemical-Thermal Modeling. Electrochimica Acta, 147, 319-329. doi:10.1016/j.electacta.2014.08.115 (Year: 2014).\*

(Continued)

*Primary Examiner* — Christopher P Domone
*Assistant Examiner* — Kimberly Wyluda
(74) *Attorney, Agent, or Firm* — Oliff PLC

(57) ABSTRACT

In this non-aqueous electrolyte secondary battery, a positive terminal and a negative terminal extend in a first direction, protrude from a laminated cell stack, and are provided so that a center line is interposed therebetween, the center line passing through a midpoint of both ends of the laminated cell stack in a second direction orthogonal to the first direction and extending in the first direction when the laminated cell stack is seen in plan view, and a first terminal with higher heat dissipation efficiency among the positive terminal and the negative terminal is provided in a location closer to the center line than a location of a second terminal with lower heat dissipation efficiency among the positive terminal and the negative terminal.

17 Claims, 6 Drawing Sheets

(51) Int. Cl.
 *H01M 10/613* (2014.01)
 *H01M 10/0525* (2010.01)
 *H01M 10/04* (2006.01)
 *H01M 4/66* (2006.01)
 *H01M 2/16* (2006.01)
 *H01M 4/583* (2010.01)
 *H01M 10/0585* (2010.01)
 *H01M 4/02* (2006.01)

(52) U.S. Cl.
 CPC ....... *H01M 4/661* (2013.01); *H01M 10/0459* (2013.01); *H01M 10/0585* (2013.01); *H01M 10/6553* (2015.04); *H01M 10/613* (2015.04); *H01M 10/6551* (2015.04); *H01M 2004/027* (2013.01); *H01M 2004/028* (2013.01); *H01M 2300/0025* (2013.01)

(58) Field of Classification Search
 CPC ........... H01M 10/0585; H01M 10/613; H01M 10/6551; H01M 2/16; H01M 4/583; H01M 4/661; H01M 2004/027; H01M 2004/208; H01M 2300/0025
 See application file for complete search history.

(56) References Cited

OTHER PUBLICATIONS

Sep. 30, 2020 Office Action issued in Chinese Patent Application No. 201810263286.0 (English Translation).

\* cited by examiner

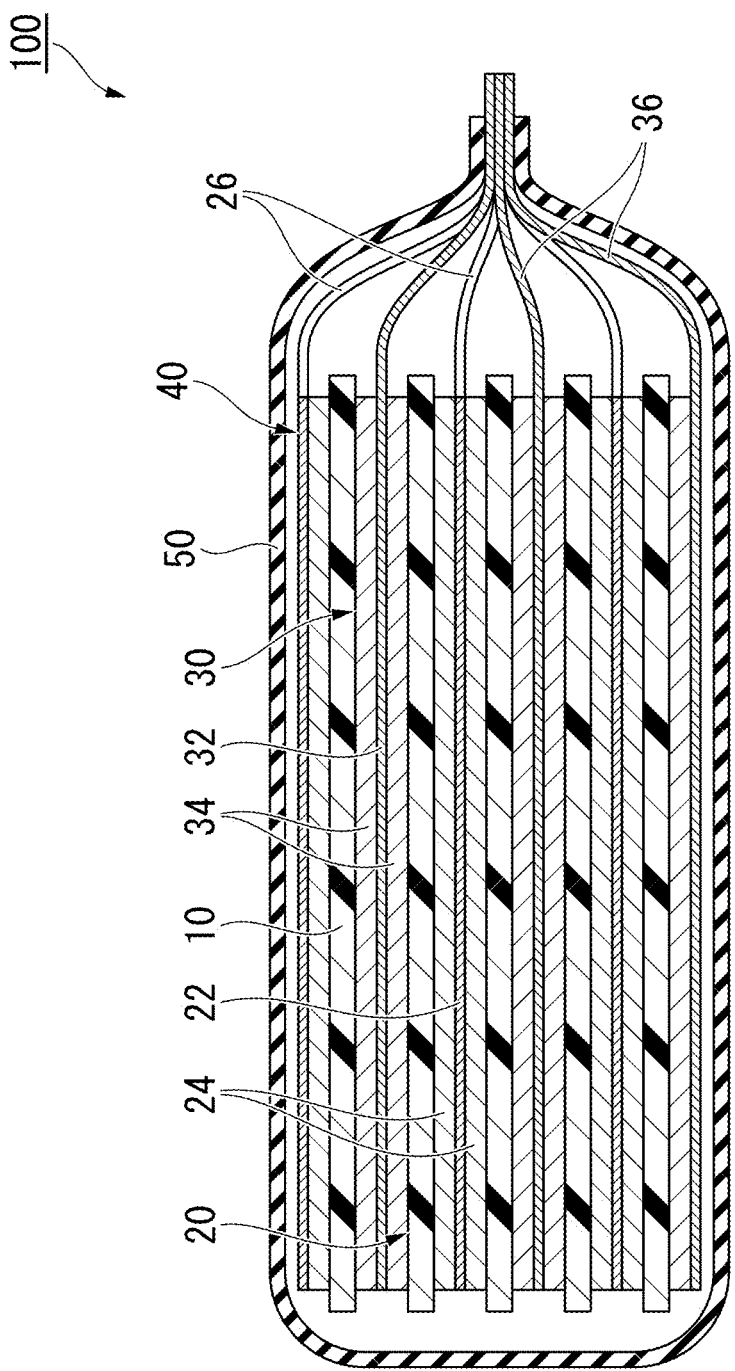
FIG. 1
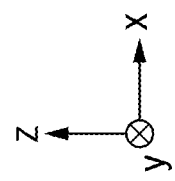

NON-AQUEOUS ELECTROLYTE SECONDARY BATTERY

BACKGROUND OF THE INVENTION

Field of the Invention

The present invention relates to a non-aqueous electrolyte secondary battery.

Priority is claimed on Japanese Patent Application No. 2017-069544, filed on Mar. 31, 2017, the content of which is incorporated herein by reference.

Description of Related Art

As an example of a non-aqueous electrolyte secondary battery, a lithium ion secondary battery is known. Compared with nickel cadmium batteries, nickel hydrogen batteries, or the like, lithium ion secondary batteries are lightweight and have high capacity, and thus are widely used as power supplies for portable electronic devices.

On the other hand, since lithium has high reactivity, attempts to enhance the safety of lithium ion secondary batteries have been investigated. When overcharging or the like occurs during operation of a lithium ion secondary battery, the battery generates heat. As one method for preventing such a problem, Patent Document 1 discloses a method of closing holes of a separator when overcharging occurs to block (shut down) passage of lithium ions and forcibly stop reactions.

Shutdown of the separator needs to occur uniformly in a plane. This is because, when a portion that has not been shut down is in the plane, lithium ions pass through the portion and reactions continue to proceed. The shutdown of the separator occurs depending on the temperature of the battery. Therefore, it is necessary to make the temperature of the battery uniform.

Patent Document 2 discloses a technology in which a metallic shaft center which is continuous from the inside to the outside of a battery is provided, and the shaft center and a connecting member of a positive electrode or a negative electrode are joined so that heat generated due to an abnormal reaction of the battery such as overcharging can be easily dissipated from the shaft center via the connecting member, and a deviation in the temperature distribution of the entire electrode group can be reduced.

PATENT DOCUMENTS

[Patent Document 1] Japanese Unexamined Patent Application, First Publication No. 2016-181326

[Patent Document 2] Japanese Unexamined Patent Application, First Publication No. 2006-040772

SUMMARY OF THE INVENTION

However, the lithium ion secondary battery described in Patent Document 1 cannot sufficiently reduce a deviation in the temperature distribution of the battery. The lithium ion secondary battery described in Patent Document 2 can reduce a deviation in the temperature distribution between a plurality of electrode groups, but cannot reduce a deviation in the temperature distribution in a direction toward a lead terminal (tab) of one battery.

The present invention has been made in view of the above-described problems, and it is an object of the present invention to provide a non-aqueous electrolyte secondary battery capable of reducing a deviation in an in-plane temperature distribution.

The present inventors focused on a difference in heat dissipation efficiency due to thermal conductivity and the like of each member constituting the non-aqueous electrolyte secondary battery, and found that a deviation in the temperature distribution can be reduced by assembling the non-aqueous electrolyte secondary battery in consideration of heat dissipation efficiency of each member.

That is, in order to solve the above problem, the following methods are provided.

(1) A non-aqueous electrolyte secondary battery according to one aspect of the present invention includes a laminated cell stack having one or more layers of: a positive electrode having a positive electrode current collector to which a positive terminal is connected; a negative electrode having a negative electrode current collector to which a negative terminal is connected; and a separator disposed between the positive electrode and the negative electrode, in which the positive terminal and the negative terminal extend in a first direction, protrude from the laminated cell stack, and are provided so that a center line is interposed therebetween, the center line passing through a midpoint of both ends of the laminated cell stack in a second direction orthogonal to the first direction and extending in the first direction when the laminated cell stack is seen in plan view, and a first terminal with higher heat dissipation efficiency among the positive terminal and the negative terminal is provided in a location closer to the center line than a location of a second terminal with lower heat dissipation efficiency among the positive terminal and the negative terminal.

(2) In the non-aqueous electrolyte secondary battery according to the above-described aspect, when the heat dissipation efficiency of the first terminal is referred to as $E1$, the heat dissipation efficiency of the second terminal is referred to as $E2$, and a width in the second direction of the laminated cell stack is referred to as $W$, with respect to a division line dividing the laminated cell stack at a ratio of $E1:E2$ in the second direction, a second division line dividing a space between the first terminal and the second terminal at the ratio of $E1:E2$ in the second direction is within a range from a position shifted by $W \times E1/E2 \times 0.3$ from the division line toward the first terminal to a position shifted by $W \times E1/E2 \times 0.5$ from the division line toward the second terminal.

(3) In the non-aqueous electrolyte secondary battery according to the above-described aspect, positions of the division line and the second division line in the second direction coincide with each other.

According to the non-aqueous electrolyte secondary battery of the above-described aspects, a deviation in the in-plane temperature distribution can be reduced.

BRIEF DESCRIPTION OF THE DRAWINGS

FIG. 1 is a schematic cross-sectional view of a non-aqueous electrolyte secondary battery according to an embodiment of the present invention.

DETAILED DESCRIPTION OF THE INVENTION

Figure 2:
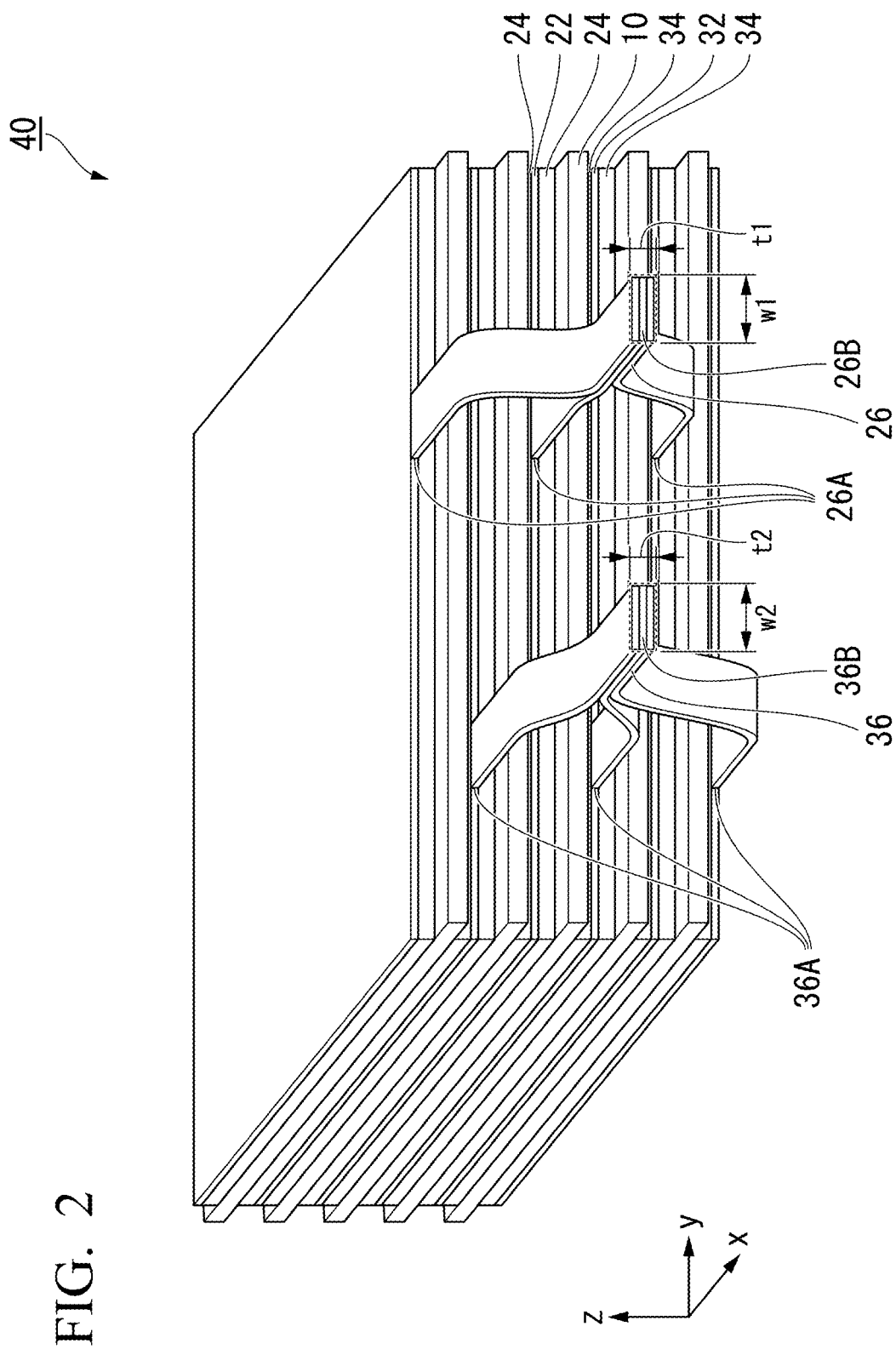
FIG. 2 is a schematic perspective view of a laminated cell stack of the non-aqueous electrolyte secondary battery according to the present embodiment.

Hereinafter, an embodiment of the present invention will be described in detail with reference to the drawings as appropriate. In the drawings used in the following description, there are cases in which characteristic portions are appropriately enlarged for convenience of illustration so that characteristics of the present invention can be easily understood, and dimensional ratios of respective constituent elements may be different from actual ones. Materials, dimensions, and the like illustrated in the following description are merely examples, and the present invention is not limited thereto, and can be appropriately modified within a range not changing the gist of the present invention.

[Non-Aqueous Electrolyte Secondary Battery]

FIG. 1 is a schematic cross-sectional view of a non-aqueous electrolyte secondary battery according to the present embodiment. As shown in FIG. 1, the non-aqueous electrolyte secondary battery 100 according to the present embodiment includes a laminated cell stack 40 and an exterior body 50. The laminated cell stack 40 and a non-aqueous electrolyte (not illustrated) are accommodated in an accommodating space provided in the exterior body 50.

(Laminated Cell Stack)

As shown in FIG. 1, the laminated cell stack 40 includes a positive electrode 20, a negative electrode 30, and a separator 10 in one or more layers, respectively. The separator 10 is disposed between the positive electrode 20 and the negative electrode 30. The positive electrode 20, the negative electrode 30, and the separator 10 are provided in one or more layers, respectively.

The positive electrode 20 includes a positive electrode current collector 22, a positive electrode active material layer 24, and a positive terminal 26. A first end portion of the positive terminal 26 is connected to the positive electrode current collector 22, and a second end portion thereof extends to the outside of the exterior body 50. Hereinafter, a first direction in which the positive terminal 26 extends is referred to as an x direction, a stacking direction of the laminated cell stack 40 is referred to as a z direction, and a direction orthogonal to both the x direction and the z direction in an in-plane direction of the laminated cell stack 40 is referred to as a y direction.

[Positive Electrode]

The positive electrode 20 includes the positive electrode current collector 22 and the positive electrode active material layer 24. The positive electrode active material layer 24 is disposed on both surfaces of the positive electrode current collector 22.

The positive electrode current collector 22 need only be a conductive plate, and, for example, a metal thin plate of aluminum, copper, or nickel foil can be used. The positive terminal 26 need only have conductivity, and the same material as the positive electrode current collector 22 can be used. In order to lower contact resistance, it is preferable that the same material be used for both.

The positive electrode active material layer 24 contains a positive electrode active material and a binder, and, if necessary, a conductive auxiliary agent.

An electrode active material capable of reversibly proceeding with storage and release of ions, desorption (deintercalation) and insertion (intercalation) of ions, or doping and dedoping of ions and counter anions of the ions (for example, $PF_6^-$) can be used for the positive electrode active material. As the ions, lithium, magnesium, or the like can be used.

For example, lithium cobalt oxide ($LiCoO_2$), lithium nickel oxide ($LiNiO_2$), lithium manganese oxide ($LiMnO_2$), spinel-type lithium manganese oxide ($LiMn_2O_4$), a complex metal oxide represented by a general formula: $LiNi_xCo_yMn_zM_{a2}$ (x+y+z+a=1, 0≤x<1, 0≤y<1, 0≤z<1, 0≤a<1, M is one or more elements selected from Al, Mg, Nb, Ti, Cu, Zn, and Cr), complex metal oxides including a lithium vanadium compound ($LiV_2O_5$), olivine type $LiMPO_4$ (in which, M represents VO or one or more elements selected from Co, Ni, Mn, Fe, Mg, Nb, Ti, Al and Zr), lithium titanate ($Li_4Ti_5O_{12}$), $LiNi_xCo_yAl_zO_2$ (0.9<x+y+z<1.1), and the like, polyacetylene, polyaniline, polypyrrole, polythiophene, polyacene, and the like, can be exemplified.

As the conductive auxiliary agent, carbon powder including carbon black or the like, carbon nanotubes, a carbon material, a fine metal powder including copper, nickel, stainless steel, iron or the like, a mixture of a carbon material and a fine metal powder, and a conductive oxide such as indium tin oxide (ITO), can be exemplified. When sufficient conductivity can be secured only with the positive electrode active material, the non-aqueous electrolyte secondary battery 100 may not include such a conductive auxiliary agent.

Also, the positive electrode active material layer contains a binder. As the binder, a known binder can be used. Polyvinylidene fluoride (PVDF), polytetrafluoroethylene (PTFE), a tetrafluoroethylene-hexafluoropropylene copolymer (FEP), a tetrafluoroethylene-perfluoroalkyl vinyl ether copolymer (PFA), an ethylene-tetrafluoro ethylene copolymer (ETFE), polychlorotrifluoroethylene (PCTFE), an ethylene-chlorotrifluoroethylene copolymer (ECTFE), polyvinyl fluoride (PVF), and the like can be exemplified.

[Negative Electrode]

The negative electrode 30 includes a negative electrode current collector 32, a negative electrode active material layer 34, and a negative terminal 36. A first end portion of the negative terminal 36 is connected to the negative electrode current collector 32, and a second end portion thereof extends to the outside of the exterior body 50.

For the negative electrode current collector 32 and the negative terminal 36, the same material as in the positive electrode can be used. Similarly to the positive electrode current collector 22, the negative electrode active material layer 34 is disposed on both surfaces of the negative electrode current collector 32.

For the negative electrode current collector 32 and the negative terminal 36, those similar to the positive electrode current collector 22 and the positive terminal 26 of the positive electrode 20 can be used. Since a precipitate of lithium may be formed at the negative electrode 30, it is particularly preferable to use copper having low reactivity with lithium for the negative electrode current collector 32 and the negative terminal 36.

The negative electrode active material layer 34 includes a negative electrode active material and a binder, and may include, if necessary, a conductive auxiliary agent.

The negative electrode active material may be any compound capable of storing and releasing lithium ions and a known negative electrode active material can be used. For the negative electrode active material, carbon materials capable of storing and releasing metal lithium and lithium ions including graphite (natural graphite, artificial graphite), carbon nanotubes, hardly graphitizable carbon, easily graphitizable carbon, low temperature calcined carbon, and the like, metals capable of combining with lithium including aluminum, silicon, tin, and the like, amorphous compounds mainly composed of an oxide including $SiO_x$ ($0<x<2$), tin dioxide, and the like, and particles containing lithium titanate ($Li_4Ti_5O_{12}$) and the like, can be exemplified.

For the conductive auxiliary agent and the binder, those similar to those in the positive electrode can be used. As the binder used for the negative electrode 30, for example, cellulose, styrene-butadiene rubber, ethylene-propylene rubber, polyimide resin, polyamide-imide resin, acrylic resin, or the like may be used in addition to those exemplified in the positive electrode 20.

[Separator]

The separator 10 need only be made of an electrically insulating porous structure, and a single layer of a film made of polyethylene, polypropylene, or polyolefin, a stretched film of a laminated cell stack or a mixture of the above resins, or a non-woven fabric made of at least one constituent material selected from a group consisting of cellulose, polyester, and polypropylene, can be exemplified.

[Electrolyte]

An electrolyte is impregnated in the positive electrode active material layer 24 and the negative electrode active material layer 34. For the electrolyte, an electrolyte solution (aqueous electrolyte solution, electrolyte solution using an organic solvent) containing a lithium salt or the like can be used. However, since a decomposition voltage of the aqueous electrolyte solution is electrochemically low, a durable voltage at the time of charging is limited to a low level. Therefore, an electrolyte solution (non-aqueous electrolyte solution) using an organic solvent is preferable.

The non-aqueous electrolyte solution includes an electrolyte dissolved in the non-aqueous solvent, and a cyclic carbonate and a chain carbonate may be contained as the non-aqueous solvent.

For the cyclic carbonate, those capable of solvating the electrolyte can be used. For example, ethylene carbonate, propylene carbonate, butylene carbonate, and the like can be used.

The chain carbonate can lower viscosity of the cyclic carbonate. Diethyl carbonate, dimethyl carbonate, and ethyl methyl carbonate can be exemplified. In addition, methyl acetate, ethyl acetate, methyl propionate, ethyl propionate, γ-butyrolactone, 1,2-dimethoxyethane, 1,2-diethoxyethane, and the like may be mixed and used.

A ratio of the cyclic carbonate to the chain carbonate in the non-aqueous solvent is preferably 1:9 to 1:1 by volume.

(Exterior Body)

The exterior body 50 seals the laminated cell stack 40 and the electrolyte therein. The exterior body 50 prevents the electrolyte from leaking to the outside, and prevents moisture or the like from entering the non-aqueous electrolyte secondary battery 100 from the outside.

For example, a metallic laminate film in which a metal foil is coated with a polymer film from both sides can be used for the exterior body 50. For example, an aluminum foil can be used for the metal foil, and a film of polypropylene or the like can be used for the polymer film. For example, a polymer having a high melting point such as polyethylene terephthalate (PET) and polyamide is preferable as a material of an outer polymer film, and polyethylene (PE), polypropylene (PP), or the like is preferable as a material of an inner polymer film.

[Function of Non-Aqueous Electrolyte Secondary Battery and Arrangement of Positive Terminal and Negative Terminal Associated Therewith]

The non-aqueous electrolyte secondary battery 100 operates by lithium ions moving between the positive electrode active material layer 24 and the negative electrode active material layer 34.

For example, when lithium ions move from the positive electrode active material layer 24 to the negative electrode active material layer 34 via the separator 10, a potential difference is generated between the positive electrode 20 and the negative electrode 30. Electrons captured by the lithium ions in the negative electrode active material layer 34 move so that this potential difference is alleviated. Since the separator 10 has insulating properties, they cannot directly move from the negative electrode active material layer 34 to the positive electrode active material layer 24 via the separator 10. Therefore, the electrons flow to the outside via the positive electrode current collector 22 and the positive terminal 26. When the opposite reaction occurs, electrons flow to the outside via the negative electrode current collector 32 and the negative terminal 36.

FIG. 2 is a schematic perspective view of a layered cell stack of the non-aqueous electrolyte secondary battery according to the present embodiment. As shown in FIG. 2, first end portions 26A of the positive terminal 26 and first end portions 36A of the negative terminal 36 are respectively connected to the positive electrode current collectors 22 and the negative electrode current collectors 32. On the other hand, at a second end portion 26B of the positive terminal 26 and a second end portion 36B of the negative terminal 36, the positive terminal 26 and the negative terminal 36 extended from the positive electrode current collectors 22 and the negative electrode current collectors 32 are respectively integrated, and extend to the outside of the exterior body 50 therefrom.

Therefore, when electrons generated at the positive electrode are discharged to the outside, the electrons pass through the second end portion 26B of the positive terminal 26, and when electrons generated at the negative electrode are discharged to the outside, the electrons pass through the second end portion 36B of the negative terminal 36.

When electrons are exchanged in the laminated cell stack 40, the laminated cell stack 40 generates heat. A heat dissipation path for the heat generated in the laminated cell stack 40 to be dissipated is the same as the discharge path of the electrons. A periphery of the laminated cell stack 40 is covered with the exterior body 50. Therefore, heat cannot easily be dissipated via the exterior body 50, and much of the heat generated is dissipated from the second end portions 26B and 36B via the positive terminal 26 and the negative terminal 36.

In other words, heat dissipation efficiency of the heat generated in the laminated cell stack 40 highly depends on heat dissipation efficiency of the positive terminal 26 and heat dissipation efficiency of the negative terminal 36. Further, heat dissipation efficiency of the positive terminal 26 highly depends on the second end portion 26B, which is an outlet of the positive terminal 26, and the heat dissipation efficiency of the negative terminal 36 highly depends on the second end portion 36B which is an outlet of the negative terminal 36.

Therefore, the heat dissipation efficiency of the positive terminal 26 can be expressed by the product of an area of the second end portion 26B, which is the outlet of the positive terminal 26, and thermal conductivity of the positive terminal 26. As shown in FIG. 2, when a cross section of the positive terminal 26 is quadrangular, and when a thickness t1 at the second end portion 26B of the positive terminal 26, a width w1 at the second end portion 26B of the positive terminal 26, thermal conductivity λ1 of the positive terminal 26, and heat dissipation efficiency E1 of the positive terminal 26 are assumed, the following relational expression (1) is satisfied.

$$E1 = t1 \times w1 \times \lambda 1 \quad (1)$$

Similarly, the heat dissipation efficiency of the negative terminal 36 can also be expressed by the product of an area of the second end portion 36B, which is the outlet of the negative terminal 36, and thermal conductivity of the negative terminal 36. As shown in FIG. 2, when a cross section of the negative terminal 36 is quadrangular, and when a thickness t2 at the second end portion 36B of the negative terminal 36, a width w2 at the second end portion 36B of the negative terminal 36, thermal conductivity λ2 of the negative terminal 36, and heat dissipation efficiency E2 of the negative terminal 36 are assumed, the following relational expression (2) is satisfied.

$$E2 = t2 \times w2 \times \lambda 2 \quad (2)$$

Here, the heat dissipation efficiency of the positive terminal 26 often does not coincide with the heat dissipation efficiency of the negative terminal 36 in many cases. For example, when a material constituting the positive terminal 26 is different from a material constituting the negative terminal 36, the respective thermal conductivities are different from each other. Also, when the number of the positive electrode current collector 22 is different from the number of the negative electrode current collector 32, thicknesses of the positive terminal 26 and a negative terminal 36 changes.

In order to reduce a deviation in the temperature distribution in an xy plane of the non-aqueous electrolyte secondary battery 100, it is preferable to design the non-aqueous electrolyte secondary battery 100 in consideration of heat dissipation efficiencies of the positive terminal 26 and the negative terminal 36. In the following description, it is assumed that the heat dissipation efficiency of the positive terminal 26 is superior to that of the negative terminal 36.

Figure 3:
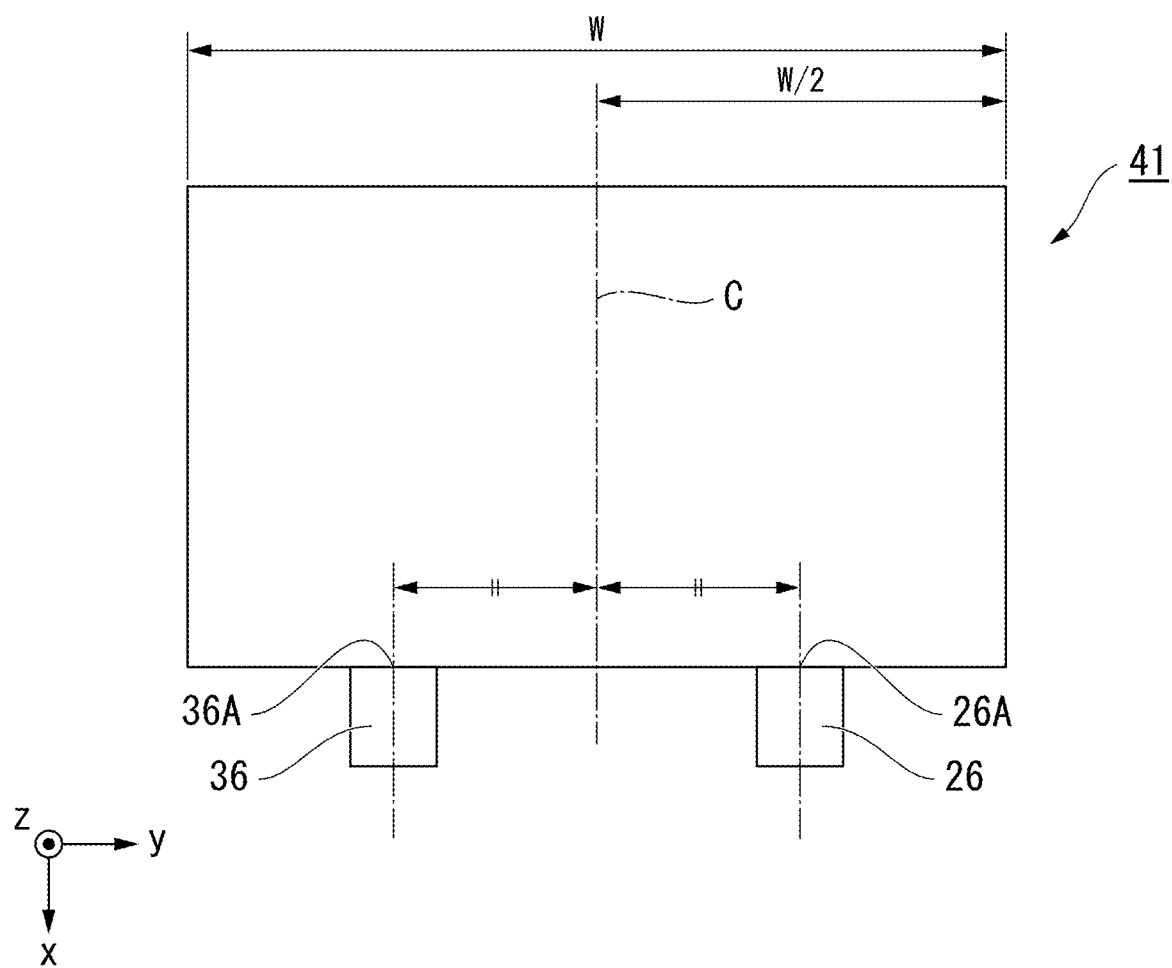
FIG. 3 is a schematic plan view of a laminated cell stack of the non-aqueous electrolyte secondary battery in which a positive terminal and a negative terminal are disposed at equal distances.

FIG. 3 is a schematic plan view of a laminated cell stack of the non-aqueous electrolyte secondary battery in which the positive terminal and the negative terminal are disposed at equal distances from a center line C. In a laminated cell stack 41 shown in FIG. 3, the positive terminal 26 and the negative terminal 36 are provided so that the center line C passing through a midpoint of the laminated cell stack 41 in a y direction is interposed therebetween in the y direction. A distance between the positive terminal 26 and the center line C and a distance between the negative terminal 36 and the center line C are the same.

Since the negative terminal 36 has lower heat dissipation efficiency than the positive terminal 26, when the non-aqueous electrolyte secondary battery shown in FIG. 3 is operated, heat accumulates on the negative terminal 36 side. As a result, in the plane of the laminated cell stack 41, the temperature on the negative terminal 36 side is relatively higher than that on the positive terminal 26 side.

Figure 4:
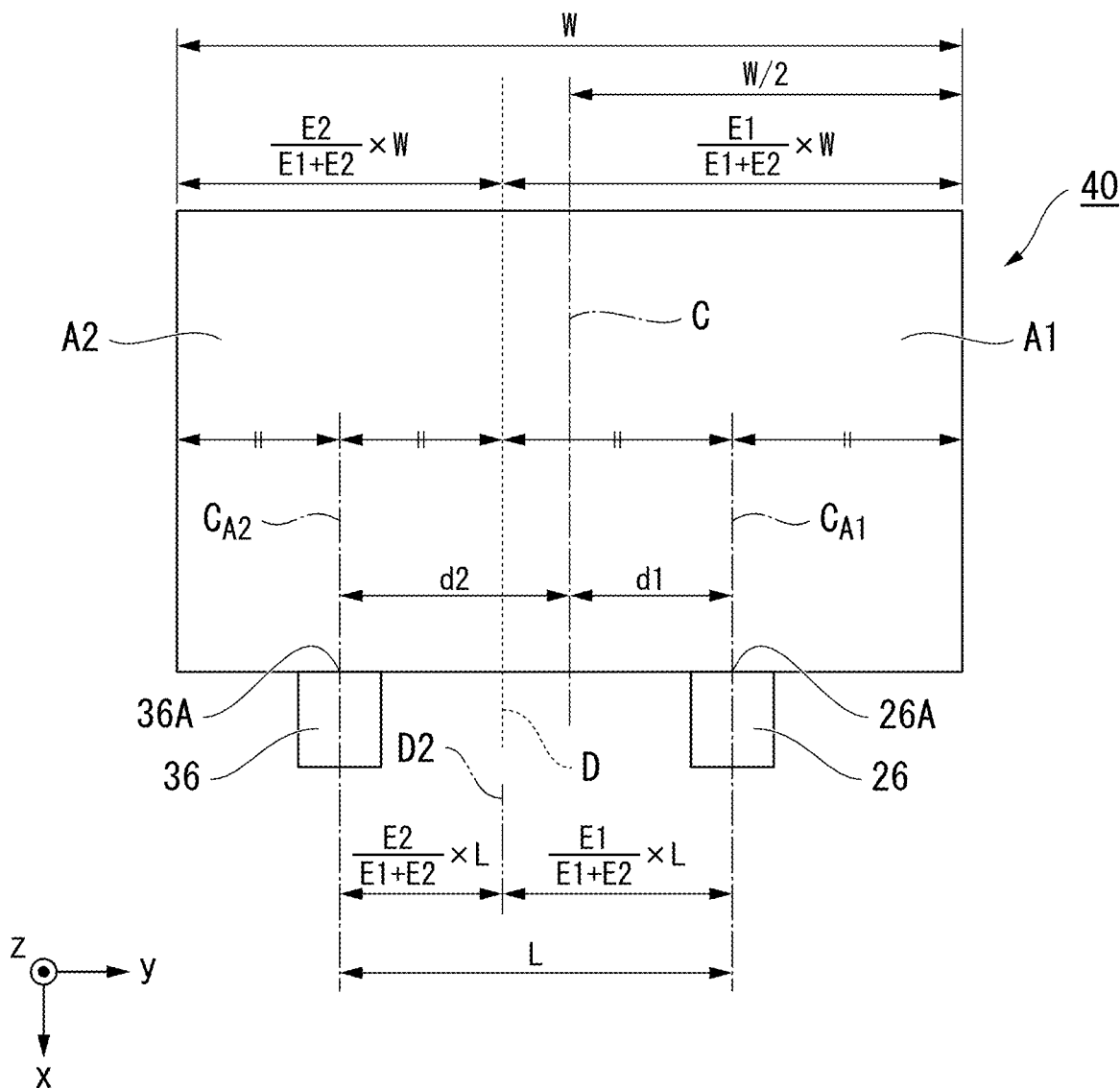
FIG. 4 is a schematic plan view of the laminated cell stack of the non-aqueous electrolyte secondary battery according to the present embodiment.

In contrast, FIG. 4 is a schematic plan view of the laminated cell stack of the non-aqueous electrolyte secondary battery according to the present embodiment. The laminated cell stack 40 shown in FIG. 4 coincides with the laminated cell stack 41 shown in FIG. 3 in that the positive terminal 26 and the negative terminal 36 are provided so that the center line C is interposed therebetween in the y direction. On the other hand, the laminated cell stack 40 shown in FIG. 4 is different in that the positive terminal 26 with high heat dissipation efficiency is provided on the side of the center line C with respect to the negative terminal 36 with low heat dissipation efficiency. That is, a distance d1 between the center line C and a center of the first end portion 26A of the positive terminal 26 is smaller than a distance d2 between the center line C and a center of the first end portion 36A of the negative terminal 36.

In the laminated cell stack 40 shown in FIG. 4, an area primarily serving for heat dissipation in the positive terminal 26 increases, and an area primarily serving for heat dissipation in the negative terminal 36 decreases. Since the heat dissipation efficiency of the positive terminal 26 is higher than that of the negative terminal 36, heat in the laminated cell stack 40 can be released even when the area of the positive terminal 26 serving for heat dissipation increases. As a result, heat accumulation in the plane of the laminated cell stack 40 is suppressed, and the deviation in the in-plane temperature distribution of the laminated cell stack 40 is suppressed.

Also, it is preferable that the positive terminal 26 and the negative terminal 36 be disposed at positions satisfying the following conditions.

First, when heat dissipation efficiency of the positive terminal 26 is referred to as E1 and heat dissipation efficiency of the negative terminal 36 is referred to as E2, a division line D is defined which divides the laminated cell stack 40 in the y direction so that areas of a region A1 of the positive terminal 26 and a region A2 of the negative electrode side have a ratio of E1:E2. In FIG. 4, the division line D divides a width W of the laminated cell stack 40 at the ratio E1:E2 in the y direction from the positive terminal 26 side.

Next, a second division line D2 is defined which divides an inter-terminal distance L in the y direction between planned installation positions of the positive terminal 26 and the negative terminal 36 at the ratio of E1:E2 from the positive terminal 26 side. In FIG. 4, the second division line D2 divides the inter-terminal distance L at the ratio of E1:E2 from the positive terminal 26 side.

At this time, it is preferable that the second division line D2 be provided within a range from a position shifted by W×E1/(E1+E2)×0.3 toward the positive terminal 26 to a position shifted by W×E1/(E1+E2)×0.5 toward the negative terminal 36 with respect to the division line D. Also, it is more preferable that the second division line D2 be provided within a range from a position shifted by W×E1(E1+E2)×0.2 toward the positive terminal 26 to a position shifted by W×E1(E1+E2)×0.2 toward the negative terminal 36 with respect to the division line D, and it is further preferable that positions of the division line D and the second division line D2 in the y direction coincide with each other. Here, meaning of the range will be more specifically described.

When heat dissipation efficiency of the positive terminal 26 is referred to as E1 and heat dissipation efficiency of the negative terminal 36 is referred to as E2, heat dissipation of the non-aqueous electrolyte secondary battery 100 can be most efficiently performed when the positive terminal 26 serves for heat dissipation in a range (region A1) of E1/(E1+E2) of a total area of the laminated cell stack 40 and the negative terminal 36 serves for heat dissipation in a range (region A2) of E2/(E1+E2) of the total area of the laminated cell stack 40.

Therefore, when the positive terminal 26 is provided at a position overlapping a center line $C_{A1}$ in the y direction of the region A1, a deviation in the temperature distribution in the region A1 can be minimized. Similarly, when the negative terminal 36 is also provided at a position overlapping a center line $C_{A2}$ in the y direction of the region A2, a deviation in the temperature distribution in the region A2 can be minimized. In this case, a position in the y direction of the second division line D2, which divides the inter-terminal distance L between the positive terminal 26 and the negative terminal 36 at the ratio of E1:E2 from the positive terminal 26 side, coincides with a position in the y direction of the division line D which divides the region A1 and the region A2. That is, when positions of the division line D and the second division line D2 in the y direction perfectly coincide with each other, a deviation in the in-plane temperature distribution of the laminated cell stack 40 can be minimized.

On the other hand, each of the positions at which the positive terminal 26 and the negative terminal 36 are installed is not limited to one point that satisfies the above-described conditions, and a certain degree of shift from the position that satisfies the above-described conditions is permitted. A range in which particularly high heat dissipation efficiency can be exhibited even when it is shifted toward the positive terminal 26 with respect to the division line D and a range in which particularly high heat dissipation efficiency can be exhibited even when it is shifted toward the negative terminal 36 with respect to the division line D are the above-described range.

As described above, according to the non-aqueous electrolyte secondary battery according to the present embodiment, it is possible to suppress a deviation in the temperature distribution in the in-plane direction of the non-aqueous electrolyte secondary battery. That is, even when the non-aqueous electrolyte secondary battery generates heat due to overcharge or the like, it is possible to shut down the separator uniformly in the plane, thereby the safety of the non-aqueous electrolyte secondary batteries can be improved.

While embodiments of the present invention have been described above in detail with reference to the accompanying drawings, the respective configurations and combinations thereof in the respective embodiments are merely examples, and additions, omissions, substitutions, and other changes to the configurations are possible without departing from the spirit of the present invention.

Figure 5:
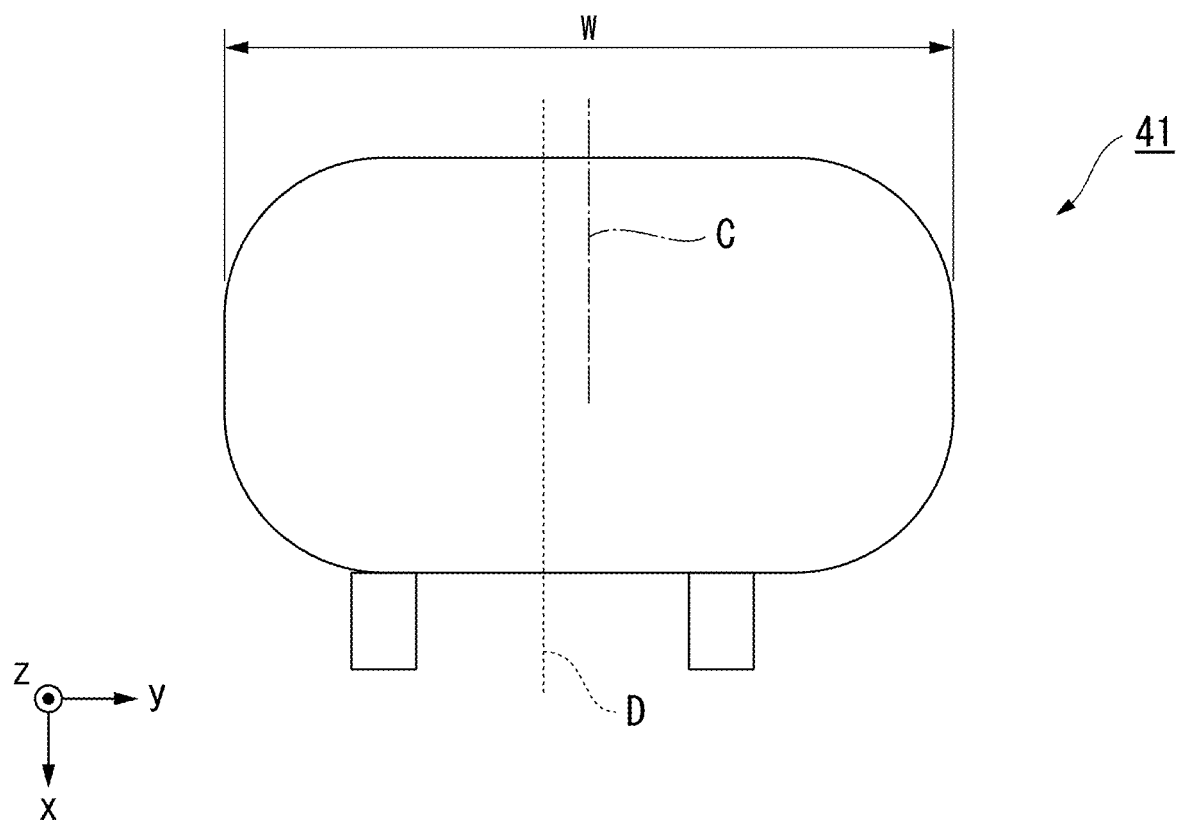
FIG. 5 is a schematic plan view of another example of a laminated cell stack of the non-aqueous electrolyte secondary battery according to the present embodiment.

For example, a shape of the laminated cell stack 40 is not limited to a quadrangle in plan view. In FIG. 5, corner portions at corners of a quadrangle are formed in an arc shape. Even in this case, the same relationship is established by assuming a distance between two points which are farthest apart in the y direction as the width W.

In the above example, the case in which heat dissipation efficiency of the positive terminal 26 is superior to heat dissipation efficiency of the negative terminal 36 has been described as an example, but heat dissipation efficiency of the negative terminal 36 may be superior to heat dissipation efficiency of the positive terminal 26.

[Method of Manufacturing Non-Aqueous Electrolyte Secondary Battery]

The non-aqueous electrolyte secondary battery 100 can be manufactured by a known method except setting of mounting positions of the positive terminal 26 and the negative terminal 36. Heat dissipation efficiencies of the positive terminal 26 and the negative terminal 36 can be respectively obtained from a width, a thickness, the number of laminated cell stack, and thermal conductivity of the positive terminal 26 and the negative terminal 36.

First, the positive electrode 20 and the negative electrode 30 are fabricated. The positive electrode 20 and the negative electrode 30 differ only in the material to be active materials, and can be fabricated by the same manufacturing method.

A positive electrode active material, a binder, and a solvent are mixed to form a coating material. If necessary, a conductive auxiliary agent may be further added thereto. As the solvent, for example, water, N-methyl-2-pyrrolidone, N, N-dimethylformamide, or the like can be used. A composition ratio of the positive electrode active material, the conductive auxiliary agent, and the binder is preferably 80 wt % to 90 wt %: 0.1 wt % to 10 wt %: 0.1 wt % to 10 wt % in terms of mass ratio. These mass ratios are adjusted to be 100 wt % as a whole.

A method of mixing these components for forming the coating material is not particularly limited, and an order of the mixing is also not particularly limited. The above-described coating material is applied on a positive electrode current collector. A coating method is not particularly limited, and a method usually employed for fabricating electrodes can be used. A slit die coating method and a doctor blade method can be exemplified. For the negative electrode as well, similarly, the coating material is applied on a negative electrode current collector.

Next, the solvent contained in the coating material applied on the positive electrode current collector and the negative electrode current collector is removed. A removal method is not particularly limited. For example, the positive electrode current collector and the negative electrode current collector coated with the coating material may be dried in air atmosphere at 80° C. to 150° C. Then, the positive electrode 20 and the negative electrode 30 are completed.

Then, the positive electrode 20, the negative electrode 30, and the separator 10 are laminated so that the separator 10 is interposed between the positive electrode 20 and the negative electrode 30 to form the laminated cell stack 40.

Finally, the laminated cell stack 40 is sealed in the exterior body 50. A non-aqueous electrolyte may be injected into the exterior body 50, or the laminated cell stack 40 may be impregnated with the non-aqueous electrolyte. Then, heat or the like is applied to the exterior body 50 so that the exterior body 50 is sealed, and thereby the non-aqueous electrolyte secondary battery 100 is fabricated.

EXAMPLES

Example 1-1

First, a positive electrode was fabricated. For the positive electrode, a positive electrode active material was coated on an aluminum foil (thickness 12 μm, thermal conductivity 237.5 W/mK) to form a positive electrode active material layer. The positive electrode active material layer contains 90 parts by mass of $LiNi_{0.8}Co_{0.15}Al_{0.05}O_2$ (active material), 6 parts by mass of carbon powder (conductive auxiliary agent), and 4 parts by mass of polyvinylidene fluoride (PVDF, binder).

Similarly, a negative electrode was fabricated. For the negative electrode, a negative electrode active material was coated on a copper foil (thickness 11 μm, thermal conductivity 400 W/mK) to form a negative electrode active material layer. The negative electrode active material layer contained 87 parts by mass of mesophase carbon microbeads (MCMB, active material), 3 parts by mass of carbon powder (conductive auxiliary agent), and 10 parts by mass of PVDF.

Also, porous polyethylene having a thickness of 12 μm was prepared as a separator. Then, 10 positive electrodes, 11 negative electrodes, and 20 separators were laminated so that the separator was interposed between the positive electrode and the negative electrode to form a laminated cell stack. A width in the λ direction of the laminated cell stack was 30 mm, and a width in the y direction was 42 mm.

At this time, the width w1 of the positive terminal (see FIG. 2) and the width w2 (see FIG. 2) of the negative terminal were 6.5 mm, and a relation of E1:E2=7.8:13.2 was satisfied between the heat dissipation efficiency E1 of the positive terminal and the heat dissipation efficiency E2 of the negative terminal. Therefore, the positive terminal was arranged at the center of a region obtained by dividing the laminated cell stack by a ratio of E1 in plan view, and the negative terminal was arranged at the center of a region obtained by dividing the laminated cell stack by a ratio of E2 in plan view.

Then, they were sealed together with a non-aqueous electrolyte in the exterior body made of an aluminum laminate film to form a non-aqueous electrolyte secondary battery. As the non-aqueous electrolyte, one prepared by adding 1.0 M (mol/L) LiPF$_6$ as a lithium salt to a solvent in which ethylene carbonate (EC), dimethyl carbonate (DMC), and ethyl methyl carbonate (EMC) were mixed in a volume ratio of 3:4:3, was used.

Next, for the fabricated non-aqueous electrolyte secondary battery, using a secondary battery charge/discharge test apparatus, constant current constant voltage charging was performed to 4.2 V and constant current discharging was performed to 2.5 V, and then battery capacity was calculated. Charging with a constant current constant voltage up to 10 V with a current corresponding to 3C was performed for 1 hour with respect to the calculated battery capacity, which was an overcharge test. The temperature of the battery surface at this time was measured and a maximum temperature was recorded. In-plane temperatures were measured at nine positions which are product of three places in the x direction and three places in the y direction. In addition, for a non-aqueous electrolyte secondary battery designed under the same conditions, an in-plane temperature distribution in which an overcharge test was assumed was obtained by a simulation in which an overcharged state was assumed.

Comparative Example 1-1

Comparative example 1-1 was different from Example 1-1 in that positions at which the positive terminal and the negative terminal were provided were changed. The positive terminal and the negative terminal were respectively provided at a center in the y direction of each region obtained by dividing the laminated cell stack at equal intervals in the y direction. The other conditions were the same as in Example 1-1, and an in-plane temperature distribution during overcharge was measured at nine places. In addition, for a non-aqueous electrolyte secondary battery designed under the same conditions, an in-plane temperature distribution in which an overcharge test was assumed was obtained by a simulation.

When actually measured values of the temperature distributions of Example 1-1 and Comparative Example 1-1 were compared, the non-aqueous electrolyte secondary battery of Example 1-1 exhibited less deviation in the temperature distribution in the y direction.

Figure 6A:
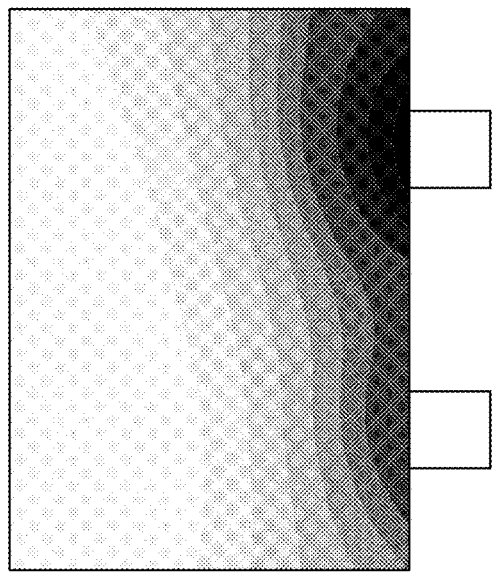
FIG. 6A shows a simulation result of an in-plane temperature distribution after operating the non-aqueous electrolyte secondary battery of Example 1-1 in which an overcharged state was assumed.
Figure 6B:
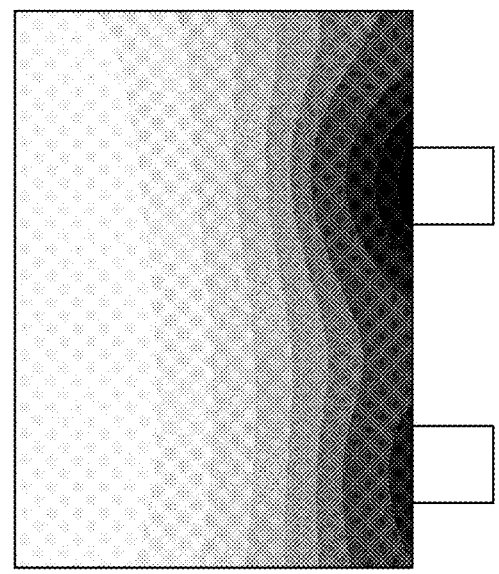
FIG. 6B shows a simulation result of an in-plane temperature distribution after operating the non-aqueous electrolyte secondary battery of Comparative Example 1-1 in which an overcharged state was assumed.

FIGS. 6A and 6B are simulation results of the in-plane temperature distributions in which an overcharge test is assumed for the non-aqueous electrolyte secondary batteries of Example 1-1 and Comparative Example 1-1. FIG. 6A shows a result of the non-aqueous electrolyte secondary battery of Comparative Example 1-1, and FIG. 6B shows a result of the non-aqueous electrolyte secondary battery of Example 1-1. As shown in FIGS. 6A and 6B, isothermal lines of the non-aqueous electrolyte secondary battery of Comparative Example 1-1 were inclined with respect to the y direction, whereas isothermal lines of the non-aqueous electrolyte secondary battery of Example 1-1 were parallel to the y direction. That is, the non-aqueous electrolyte secondary battery of Example 1-1 exhibited less deviation in the temperature distribution in the y direction. This result shows good correlation with the actually measured values.

Examination of Installation Position

Examples 1-2 to 1-5

Next, maximum values of surface temperatures of the non-aqueous electrolyte secondary battery when installation positions of the positive terminal and the negative terminal were changed from the installation positions of Example 1-1 were obtained using a simulation. The results are shown in Table 1 below.

TABLE 1

| | E1/E2 | d1 | d2 | d1/d2 | (E1/E2)/ (d1/d2) | Surface Temperature |
|---|---|---|---|---|---|---|
| Example 1-2 | 0.6 | 6.0 | 15.0 | 0.4 | 1.5 | 92.5 |
| Example 1-3 | 0.6 | 7.0 | 14.0 | 0.5 | 1.2 | 92.2 |
| Example 1-1 | 0.6 | 7.8 | 13.2 | 0.6 | 1.0 | 92.2 |
| Example 1-4 | 0.6 | 8.6 | 12.4 | 0.7 | 0.8 | 92.3 |
| Example 1-5 | 0.6 | 9.7 | 11.4 | 0.9 | 0.7 | 92.5 |
| Comparative Example 1-1 | 0.6 | 10.5 | 10.5 | 1.0 | 0.6 | 92.8 |
| Comparative Example 1-2 | 0.6 | 14.0 | 7.0 | 2.0 | 0.3 | 94.7 |

In Table 1, E1 is the heat dissipation efficiency of the positive terminal and E2 is the heat dissipation efficiency of the negative terminal. In addition, d1 is the distance of the positive terminal from the center line, and d2 is the distance of the negative terminal from the center line. Therefore, a state E1/E2=d1/d2 corresponds to a case in which a position of the division line D and a position of the second division line D2 in the y direction coincide with each other (see FIG. 3). That is, the case in which (E1/E2)/(d1/d2)=1 corresponds to Example 1-1. Also, a case in which d1/d2=1.0 corresponds to a case in which the positive terminal and the negative terminal are provided at a same distance from the center line, and corresponds to Comparative example 1-1. In Examples 1-2 to 1-5, the positive terminal and the negative terminal were provided at positions shown in Table 1.

As shown in Table 1, in all of Examples 1-1 to 1-5, the maximum values of the surface temperatures were lower than that of Comparative Example 1-1. That is, the non-aqueous electrolyte secondary batteries shown in Examples 1-1 to 1-5 were superior in heat dissipation property to the non-aqueous electrolyte secondary battery shown in Comparative Example 1-1.

Figure 7:
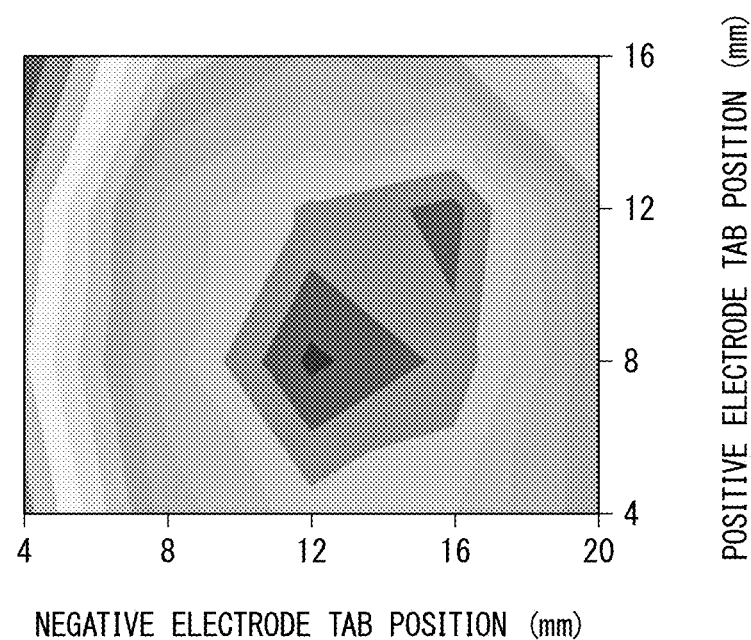
FIG. 7 is a view in which maximum values of surface temperatures were mapped when installation positions of the positive terminal and the negative terminal were changed.

Also, when installation positions of the positive terminal and the negative terminal are changed, maximum values of the surface temperatures were mapped in FIG. 7. The horizontal axis in FIG. 7 represents a position at which the negative terminal was installed, and the vertical axis in FIG. 7 represents a position at which the positive terminal was installed. An intersection point of the vertical axis and the horizontal axis corresponds to a surface temperature when the positive terminal and the negative terminal are installed at each of the predetermined positions. Also in the result of FIG. 7, the surface temperature was the lowest in Example 1-1 in which the distance d1 between the positive terminal and the center line was 7.8 mm and the distance d2 between the negative terminal and the center line was 13.2 mm.

Examples 2-1 to 2-5 and Comparative Example 2-1

Next, the same investigation was conducted by changing a configuration of the battery. In Examples 2-1 to 2-5 and Comparative Example 2-1, the number of laminated layers of the positive electrode current collector was 5, a thickness of the positive electrode current collector was 15 μm, a width of the positive terminal was 10 mm, the number of laminated layers of the negative electrode current collector was 6, a thickness of the negative electrode current collector was 10 and a width of the negative terminal was 5 mm. Other conditions were the same as in Example 1-1. For the non-aqueous electrolyte secondary batteries according to Examples 2-1 to 2-5 and Comparative Example 2-1, maximum values of surface temperatures when an overcharged state was assumed were obtained by a simulation. The results are shown in Table 2.

TABLE 2

|  | E1/E2 | d1 | d2 | d1/d2 | (E1/E2)/ (d1/d2) | Surface Temperature |
|---|---|---|---|---|---|---|
| Comparative Example 2-1 | 1.5 | 14.1 | 27.9 | 0.5 | 2.9 | 94.6 |
| Example 2-2 | 1.5 | 21.1 | 20.9 | 1.0 | 1.5 | 92.5 |
| Example 2-3 | 1.5 | 23.4 | 18.6 | 1.3 | 1.2 | 92.2 |
| Example 2-1 | 1.5 | 25.1 | 16.9 | 1.5 | 1.0 | 92.1 |
| Example 2-4 | 1.5 | 26.8 | 15.2 | 1.8 | 0.8 | 92.2 |
| Example 2-5 | 1.5 | 28.6 | 13.4 | 2.1 | 0.7 | 92.4 |

References in Table 2 correspond to references in Table 1. As shown in Table 2, even when conditions of the positive terminal and the negative terminal were changed, the surface temperature was the lowest in the case in which (E1/E2)/(d1/d2)=1 (Example 2-1). Also, in all of Examples, the maximum value of the surface temperature was lower than that in the case of d1/d2=0.5 (Comparative Example 2-1).

INDUSTRIAL APPLICABILITY

According to the non-aqueous electrolyte secondary battery, a deviation in the in-plane temperature distribution can be reduced.

EXPLANATION OF REFERENCES

10 Separator
20 Positive electrode
22 Positive electrode current collector
24 Positive electrode active material layer
26 Positive terminal
26A First end portion
26B Second end portion
30 Negative electrode
32 Negative electrode current collector
34 Negative electrode active material layer
36 Negative terminal
36A First end portion
36B Second end portion
40, 41, Laminated cell stack
50 Exterior body
100 Non-aqueous electrolyte secondary battery
C Center line
D Division line
D2 Second division line

What is claimed is:

1. A non-aqueous electrolyte secondary battery comprising a laminated cell stack including one or more layers of:
   a positive electrode having a positive electrode current collector to which a positive terminal is connected;
   a negative electrode having a negative electrode current collector to which a negative terminal is connected; and
   a separator disposed between the positive electrode and the negative electrode, wherein:
   the positive terminal and the negative terminal extend in a first direction orthogonal to a stacking direction of the laminated cell stack so as to protrude from one side of the laminated cell stack, the one side extending in a second direction orthogonal to the first direction and the stacking direction,
   a center line extends in the first direction so as to:
     pass through a midpoint of the one side of the laminated cell stack when the laminated cell stack is viewed in plan view, and
     be interposed between the positive terminal and the negative terminal,
   a first terminal with higher heat dissipation efficiency among the positive terminal and the negative terminal is provided in a location closer to the center line than a location of a second terminal with lower heat dissipation efficiency among the positive terminal and the negative terminal,
   the one side of the laminated cell stack is divided by a first division line extending in the first direction into: (i) a first side having an area proportional to E1/(E1+E2), and (ii) a second side having an area proportional to E2/(E1+E2), where E1 represents a value of the heat dissipation efficiency of the first terminal, and E2 represents a value of the heat dissipation efficiency of the second terminal,
   a first terminal center line that extends in the first direction and passes through a center of the first terminal coincides with a first side center line that extends in the first direction and passes through a center of the first side, and
   a second terminal center line that extends in the first direction and passes through a center of the second terminal coincides with a second side center line that extends in the first direction and passes through a center of the second side.

2. The non-aqueous electrolyte secondary battery according to claim 1, wherein:
   an inter-terminal region of the one side of the laminated cell stack extends a distance L in the second direction between a midpoint of the first terminal and a midpoint of the second terminal, the inter-terminal region is divided at a ratio of E1:E2 by a second division line extending in the first direction, and the second division line is positioned within a range of: a position shifted from the first division line toward the first terminal by a distance equal to W×E1/E2×0.3 to a position shifted from the first division line toward the second terminal by a distance equal to W×E1/E2×0.5, where W represents a width in the second direction of the laminated cell stack.

3. The non-aqueous electrolyte secondary battery according to claim 2, wherein a position of the first division line and a position of the second division line coincide with each other.

4. The non-aqueous electrolyte secondary battery according to claim 1, wherein cross sections of the positive terminal and the negative terminal are quadrangular, and heat dissipation efficiencies of the positive terminal and the negative terminal are shown by a formula (1) each independently, when a thickness of the terminals is shown by t, a width of the terminals are shown by w, thermal conductivity of the terminals are shown by λ, and heat dissipation efficiency of the terminals is shown by E, $$E = t \times w \times \lambda \qquad (1).$$

5. The non-aqueous electrolyte secondary battery according to claim 1, wherein when a width in the second direction of the laminated cell stack is referred to as W, a width of the first side is shown by W×E1/(E1+E2) and a width of the second side is shown by W×E2/(E1+E2).

6. The non-aqueous electrolyte secondary battery according to claim 1, wherein a width of the first terminal and a width of the second terminal are the same.

7. The non-aqueous electrolyte secondary battery according to claim 1, wherein:

the one side of the laminated cell stack extends in the second direction between a first end on a first terminal side and a second end on a second terminal side, and a distance between the first terminal and the first end is not equal to a distance between the second terminal and the second end.

8. The non-aqueous electrolyte secondary battery according to claim 7, wherein the distance between the first terminal and the first end is greater than the distance between the second terminal and the second end.

9. The non-aqueous electrolyte secondary battery according to claim 1, wherein the laminated cell stack is a quadrangle or a quadrangle having corner portions formed in an arc shape in plan view.

10. A non-aqueous electrolyte secondary battery comprising a laminated cell stack including one or more layers of:

a positive electrode having a positive electrode current collector to which a positive terminal is connected;

a negative electrode having a negative electrode current collector to which a negative terminal is connected; and a separator disposed between the positive electrode and the negative electrode, wherein:

the positive terminal and the negative terminal extend in a first direction orthogonal to a stacking direction of the laminated cell stack so as to protrude from one side of the laminated cell stack, the one side extending from a first end to a second end in a second direction that is orthogonal to the first direction and the stacking direction, the first end being closer to the positive terminal than the negative terminal, and the second end being closer to the negative terminal than the positive terminal, a first distance between the first end and the positive terminal is different from a second distance between the second end and the negative terminal, a center line extends in the first direction so as to:
pass through a midpoint of the one side of the laminated cell stack when the laminated cell stack is viewed in plan view, and
be interposed between the positive terminal and the negative terminal, a first terminal with higher heat dissipation efficiency among the positive terminal and the negative terminal is provided in a location closer to the center line than a location of a second terminal with lower heat dissipation efficiency among the positive terminal and the negative terminal, the one side of the laminated cell stack is divided by a first division line extending in the first direction into: (i) a first side having an area proportional to E1/(E1+E2), and (ii) a second side having an area proportional to E2/(E1+E2), where E1 represents a value of the heat dissipation efficiency of the first terminal, and E2 represents a value of the heat dissipation efficiency of the second terminal, an inter-terminal region of the one side of the laminated cell stack extends a distance L in the second direction between a midpoint of the first terminal and a midpoint of the second terminal, the inter-terminal region is divided by a second division line extending in the first direction into: (1) a first inter-terminal region having an area proportional to E1/(E1+E2), and (2) a second inter-terminal region having an area proportional to E2/(E1+E2), and a distance between the first division line and the second division line is equal to or less than a value represented by the formulae W×E1/(E1+E2)×0.5, where W represents a width in the second direction of the laminated cell stack.

11. The non-aqueous electrolyte secondary battery according to claim 10, wherein the laminated cell stack is a quadrangle or a quadrangle having corner portions formed in an arc shape in plan view.

12. The non-aqueous electrolyte secondary battery according to claim 10, wherein a distance between the first division line and the second division line is equal to or less than a value represented by the formulae W×E1/(E1+E2)×0.3.

13. The non-aqueous electrolyte secondary battery according to claim 10, wherein a distance between the first division line and the second division line is equal to or less than a value represented by the formulae W×E1/(E1+E2)×0.2.

14. The non-aqueous electrolyte secondary battery according to claim 10, wherein when a distance between the center line and a center of the first terminal is referred to as d1, a distance between the center line and a center of the second terminal is referred to as d2, a value obtained by the formula (E1/E2)/(d1/d2) is in a range of 0.7 to 1.5.

15. A non-aqueous electrolyte secondary battery comprising a laminated cell stack including one or more layers of:

a positive electrode having a positive electrode current collector to which a positive terminal is connected;

a negative electrode having a negative electrode current collector to which a negative terminal is connected; and a separator disposed between the positive electrode and the negative electrode, wherein:

the positive terminal and the negative terminal extend in a first direction orthogonal to a stacking direction of the laminated cell stack so as to protrude from one side of the laminated cell stack, the one side extending from a first end to a second end in a second direction that is orthogonal to the first direction and the stacking direction, the first end being closer to the positive terminal than the negative terminal, and the second end being closer to the negative terminal than the positive terminal, a first distance between the first end and the positive terminal is different from a second distance between the second end and the negative terminal, a center line extends in the first direction so as to:
  pass through a midpoint of the one side of the laminated cell stack when the laminated cell stack is viewed in plan view, and
  be interposed between the positive terminal and the negative terminal, a first terminal with higher heat dissipation efficiency among the positive terminal and the negative terminal is provided in a location closer to the center line than a location of a second terminal with lower heat dissipation efficiency among the positive terminal and the negative terminal, and a width of the first terminal in the second direction is equal to a width of the second terminal in the second direction.

16. The non-aqueous electrolyte secondary battery according to claim 15, wherein the laminated cell stack is a quadrangle or a quadrangle having corner portions formed in an arc shape in plan view.

17. The non-aqueous electrolyte secondary battery according to claim 15, wherein when a distance between the center line and a center of the first terminal is referred to as d1, a distance between the center line and a center of the second terminal is referred to as d2, a value of the heat dissipation efficiency of the first terminal is referred to as E1, and a value of the heat dissipation efficiency of the second terminal is referred to as E2, a value obtained by the formula (E1/E2)/(d1/d2) is in a range of 0.7 to 1.5.

* * * * *